US 6,789,446 B2

(12) United States Patent
Ishikawa

(10) Patent No.: US 6,789,446 B2
(45) Date of Patent: Sep. 14, 2004

(54) TORQUE CONVERTER

(75) Inventor: Masanori Ishikawa, Shizuoka (JP)

(73) Assignee: Jatco LTD, Fuji (JP)

(*) Notice: Subject to any disclaimer, the term of this patent is extended or adjusted under 35 U.S.C. 154(b) by 0 days.

(21) Appl. No.: 10/252,034

(22) Filed: Sep. 23, 2002

(65) Prior Publication Data
US 2003/0061902 A1 Apr. 3, 2003

(30) Foreign Application Priority Data
Sep. 28, 2001 (JP) .......................... 2001-303919

(51) Int. Cl.⁷ .......................... F16H 47/00; G05G 1/00; F16D 33/00
(52) U.S. Cl. .................. 74/730.1; 74/572; 192/3.21
(58) Field of Search ........................ 74/730.1, 572, 74/574; 60/330, 364; 192/3.21, 3.28

(56) References Cited

U.S. PATENT DOCUMENTS

| 4,198,818 | A | * | 4/1980 | Pickard ................ 60/330 |
| 4,997,408 | A | * | 3/1991 | Copeland ............... 464/98 |
| 5,203,835 | A | * | 4/1993 | Kohno et al. ........... 192/3.29 |
| 5,385,221 | A | * | 1/1995 | Van Maanen ........... 192/3.21 |
| 6,231,472 | B1 | * | 5/2001 | Sudau et al. ........... 475/347 |
| 6,474,062 | B1 | * | 11/2002 | Yamanaka et al. ........ 60/330 |
| 6,478,127 | B2 | * | 11/2002 | Fukushima ............. 192/3.29 |
| 2002/0029565 | A1 | * | 3/2002 | Inoue et al. ............ 60/330 |

* cited by examiner

Primary Examiner—Roger Pang
(74) Attorney, Agent, or Firm—Foley & Lardner LLP

(57) ABSTRACT

A torque converter is provided which comprises a converter cover for connection to a power source, a pump impeller attached to the converter cover, a turbine for connection to a transmission input shaft, a stator interposed between the pump impeller and the turbine, and a ring gear mounted on the converter cover and adapted to increase moment of inertia of the converter cover.

12 Claims, 3 Drawing Sheets

TORQUE CONVERTER

BACKGROUND OF THE INVENTION

The present invention relates to a torque converter having a converter cover for connection to a power source such as an engine, and more particularly to a torque converter of the kind adapted to increase the moment of inertia of the converter cover thereby enabling the converter cover to efficiently absorb or damp torsional vibration from the engine.

An example of this kind of torque converter is shown in FIG. 3 and generally indicated by 53.

In FIG. 3, indicated by 51 is a drive plate for connection to an output shaft of an engine (not shown). The torque converter 53 has a converter cover 54. The converter cover 54 is connected to the drive plate 51 at a connecting portion 52. To an outer circumferential periphery of the converter cover 54 is attached an inertia ring 55 that damp torsional vibration transmitted to the converter cover 54 from the engine. To the drive plate 51 is attached a starter ring gear 56 with which a pinion of a starter motor (not shown) is meshed.

SUMMARY OF THE INVENTION

The above-described torque converter 54 can efficiently damp torsional vibration from the engine by the effect of the inertia ring 55 mounted on the converter cover 54. However, in case the starter motor is disposed on the transmission side, it is required to dispose both the inertia ring 55 and starter ring gear 56 by the side of the torque converter, thus causing a problem of the necessity of a large space for disposition of both the inertia ring 55 and starter ring gear 56 by the side of the torque converter and a difficult work for attachment of the same.

It is accordingly an object of the present invention to provide a torque converter having a ring gear that has a function of efficiently increasing the moment of inertia of a converter cover without requiring a large, extra space and a difficult work for its attachment.

To achieve the above object, there is provided according an aspect of the present invention a torque converter comprising a converter cover for connection to a power source, a pump impeller attached to the converter cover, a turbine, a stator interposed between the pump impeller and the turbine, and a ring gear attached to the converter cover and adapted to increase moment of inertia of the converter cover.

According to another aspect of the present invention, there is provided a torque converter comprising a converter cover connected to a power source and constituting part of a power input system of the torque converter, a pump impeller attached to the converter cover, a turbine for connection to a transmission input shaft, a stator interposed between the pump impeller and the turbine, and a ring gear attached to the converter cover and adapted to increase moment of inertia of the power input system.

DESCRIPTION OF THE PREFERRED EMBODIMENT

Figure 1:
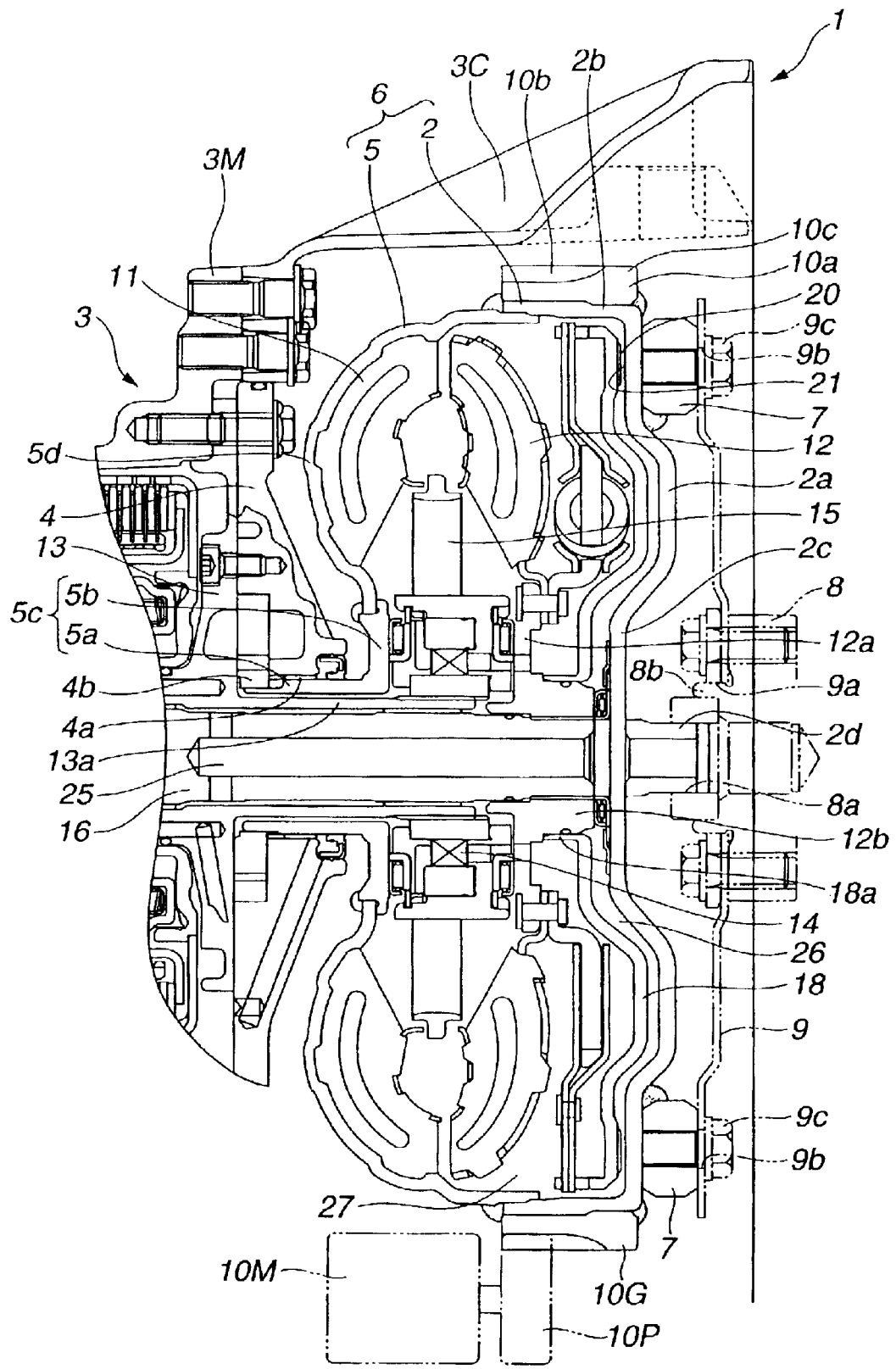
FIG. 1 is a sectional view of a torque converter according to an embodiment of the present invention.

Referring first to FIG. 1, a torque converter is generally indicated by 1 and includes a converter cover 6 made up of a front cover member 2 and a rear cover member 5. The front cover member 2 is connected to a power source such as an engine. The rear cover member 5 is attached to the front cover member 2 so as to constitute an integral unit and is rotatably supported by an oil pump case 4. The oil pump case 4 is positioned at the front end of a mission case 3M. The converter cover 6 is disposed within a converter housing 3C that is connected to the front end of the mission case 3M.

The front cover member 2 includes a circular plate portion 2a and a hollow cylindrical portion 2b extending rearward from the circular plate portion 2a. At the central part of the circular plate portion 2a is formed a recessed section 2c that is slightly recessed rearward as compared with an outer peripheral section thereof. At the center of the recessed section 2c is disposed a stub shaft portion 2d protruding forward therefrom.

Disposed radially outside of the recessed section 2c of the circular plate portion 2a are nuts 7 that are, for example, four in number and constitute a connecting portion for connection to a power source such as an engine. Namely, the nuts 7 are disposed in a circular array and with predetermined intervals on the circular plate portion, i.e., a side surface of the converter cover 6 and fixedly attached to the circular plate portion 2a by welding.

As shown by two-dot chain lines in FIG. 1, a drive plate 9 is disposed between the nuts 7 and a crankshaft 8 of an engine for connection therebetween. Specifically, the drive plate 9 has at the central portion thereof an opening 9a in which a protruded portion 8b of the crankshaft 8 is inserted. The protruded portion 8b of the crankshaft 8 has a positioning recess 8a that is engaged with the shaft portion 2d of the front cover member 2. The drive plate 9 is bolted to the crankshaft 8, with the protruded portion 8b of crankshaft 8 being held inserted in the opening 9a. The drive plate 9 is also bolted to the front cover member 2 with bolts 9c that are inserted into bolt holes 9b of the drive plate 9 and screwed into the nuts 7. By this, the drive plate 9 and front cover member 2 are connected to constitute an integral unit.

Further, welded to the outer circumferential periphery of the hollow cylindrical portion 2b of the front cover member 2 is a starter ring gear 10G that is meshed with a pinion 10P. The pinion 1op is attached to an output shaft of a starter motor 10M that is disposed within the converter housing 3C. The starter ring gear 10G has a hollow cylindrical body 10a of nearly the same axial length as the hollow cylindrical portion 2b of the front cover member 2. The hollow cylindrical body 10a includes a rear half that is toothed to constitute a ring gear portion 10b and a front half that constitutes an inertia portion 10c. In other words, the starter ring gear 10G has the ring gear portion 10b and the inertia portion 10c that are disposed side by side in an axial direction of the ring gear 10G.

The rear cover member 5 includes a hub portion 5a that is hollow cylindrical and rotatably supported on an oil pump case 4, and a circular flange portion 5b extending radially outward from the front end of the hub portion 5a. The hub portion 5a and the flange portion 5b constitute an inner part 5c having an L-shaped cross section. The rear cover member 5 further includes an outer part 5d extending radially outward from the inner part 5c of the rear cover member 5 while being curved or rounded rearward and engaged with the hollow cylindrical portion 2b of the front cover member 2.

The inner part 5c and outer part 5d of the rear cover member 5 are welded at the joining surfaces thereof, and the outer part 5d of the rear cover member 5 and the front cover member 2 are welded at the joining surfaces thereof.

The hub portion 5a of the inner part 5c of the rear cover member 5 is rotatably supported on the oil pump case 4 by way of a bushing 4a while being connected at an end to the oil pump 4b disposed within the oil pump case 4.

To the inner peripheral surface of the outer part 5d of the rear cover member 5 is attached a pump impeller 11. At a position opposite to the pump impeller 11 is disposed a turbine 12. Between the pump impeller 11 and the turbine 12 is interposed a stator 15 that is installed by way of a one way clutch 14 on a hollow cylindrical support portion 13a of an oil pump cover 13 that covers a rear side of the oil pump case 4.

In this connection, the turbine 12 has at a radially inner side thereof a turbine hub 12a connected by splines to a rotational shaft 16 that is rotatably supported on the mission case 3M and that serves as a transmission input shaft.

Between the front cover member 2 and the turbine 12 is disposed a lock-up mechanism for engaging and disengaging the pump impeller 11 and the turbine 12. The lock-up mechanism includes a lock-up piston 18 having at the central part thereof a hollow cylindrical engagement portion 18a. The engagement portion 18a is mounted on a hollow cylindrical portion 12b of the turbine hub 12a so as to be axially movable but rotationally fixed relative to the turbine hub 12a.

To an outer circumferential portion of the lock-up piston 18 that is positioned opposite to the nuts 7 is provided a lock-up facing 20. The front cover member 2 has an inner flat surface 21 that is positioned opposite to the lock-up facing 20 and perpendicular to the axis of the rotational shaft 16.

The operation of the torque converter 1 is described.

It is assumed that the engine is now at a standstill and a parking range (P) is being selected by a gear select mechanism (not shown). Under this condition, turning an ignition switch (not shown) to an ON position causes the starter motor 10M to operate, thus causing the starter ring gear 10G and therefore the converter cover 6 to be driven to rotate since the pinion 10P attached to the output shaft of the starter motor 10M is meshed with the ring gear portion 10b of the ring gear 10G.

The rotational drive force of the converter cover 6 is transmitted to the drive plate 9 by way of the nuts 7. From this drive plate 9, the drive force is transmitted to the crankshaft 8 of the engine thereby starting the engine. After start of the engine, the ignition switch is turned to the OFF position thereby stopping the operation of the starter motor 10M. A rotational drive force or power of the engine is now transmitted to the front cover member 2 by way of the drive plate 9 and the nuts 7, thus causing the converter cover 6 to be driven to rotate. The converter cover 6 thus driven to rotate can efficiently absorb or damp torsional vibration transmitted thereto from the engine since the moment of inertia of the converter cover 6 is increased by the inertia portion 10c of the starter ring gear 10G.

After that, by selecting a drive range (D) by means of the gear select mechanism, releasing a brake pedal (not shown) and depressing an accelerator pedal (not shown), the vehicle can be started. At this time of start of the vehicle or under a low-speed vehicle running condition, the engine maintains a low-speed operating condition under which the working oil passage 25 of the rotational shaft 16 is supplied with working oil or fluid of the pressure a little higher than that of working oil filled in an accommodation portion 27 that accommodates therewithin the pump impeller 11 and the turbine 12 and is located on the rear surface side of the lock-up piston 18. Due to this, the working oil within the working oil passage 25 of the rotational shaft 16 is supplied to a working oil chamber 26 that is formed between the circular plate portion 2a of the front cover member 2 and the lock-up piston 18. From this working oil chamber 26, the working oil flows through a restriction between the outer circumferential surface of the lock-up piston 18 and the inner circumferential surface of the hollow cylindrical portion 2b of the front cover member 2 into the accommodation portion 27 located on the side of the lock-up piston 18 opposite to the working oil chamber 26.

As a result, the pressure within the working oil chamber 26 becomes higher as compared with that within the accommodation chamber 27 located on the side of the lock-up piston 18 opposite to the working oil chamber 26. Thus, as shown in FIG. 1, the lock-up facing 20 of the lock-up piston 18 is held apart from the inner flat surface 21 of the front cover member 2, i.e., the lock-up mechanism is held in a lock-up released condition.

Under this lock-up released condition and under a condition where the engine is operated at low-speed and the vehicle is running at low-speed, the power of the engine is transmitted to the front cover member 2 by way of the drive plate 9 and the nuts 7, thus causing the pump impeller 11 to rotate and allowing the power from the engine to be converted into the kinetic energy of working oil filled in the converter cover 6. This kinetic energy of working oil drives the turbine 12 to rotate, and the rotational power of the turbine 12 is transmitted through turbine hub 12a to the rotational shaft 16 and inputted to the automatic transmission 3. In this instance, the rotational power of the converter cover 6 is transmitted to the oil pump 4b of the automatic transmission 3 by way of the hollow cylindrical portion 5a of the inner part 5c of the rear cover member 5.

Thereafter, when increase of the vehicle speed causes the speed ratio (output shaft rotation speed/input shaft rotation speed) of the impeller 11 and the turbine 12 to become nearly equal to "1", a lock-up command is produced by a shift control device (not shown) thereby decreasing the working oil pressure within the working oil passage 25 formed in the rotational shaft 16 to a low level.

Due to this, the working oil filled in the working oil chamber 26 is returned to the working oil passage 25, thus causing the inner pressure in the working oil chamber 26 to become lower than the inner pressure in the accommodation portion 27. Due to this, the lock-up piston 18 is caused to move axially forward, thus causing the lock-up facing 20 to be pressed against the inner flat surface 21 of the front cover member 2. The resulting frictional force at this time causes the rotational power of the front cover member 2 to be transmitted directly to the rotational shaft 16 by way of the lock-up piston 18 and the turbine hub 12a, thus allowing the lock-up mechanism to be put into a lock-up condition. Thereafter, when decrease of the vehicle speed causes the speed ratio of the impeller 11 and the turbine 12 to become nearly equal to "1", a lock-up release command is outputted by the shift control device thereby increasing the working oil pressure in the working oil passage 25 formed in the rotational shaft 16 to a high level, thus allowing the lock-up mechanism to be put into a lock-up released condition.

In the foregoing, since the starter ring gear 10G has the toothed ring gear portion 10b and the inertia portion 10c, only installing the starter ring gear 10G on the converter cover 6 enables the starter ring gear 10G to perform both of a starter function and an inertia mass function. Namely, the starter ring gear 10G can function as a starter ring gear and as an inertia mass that can efficiently increase the moment of inertia of the converter cover 6. Accordingly, this embodiment can efficiently increase the moment of inertia of the converter cover 6 without requiring an increased space and can absorb or damp torsional vibration from the engine assuredly. In other words, the converter cover 6, nuts 7 and the drive plate 9 constitute an input system of the torque converter 1. The starter ring gear 10G installed on the converter cover 6 can efficiently increase the moment of inertia of the input system of the torque converter 1.

Further, this embodiment can reduce the number of parts and the man-hour for assembly since the starter ring gear 10G has two functions and can be attached with ease by welding.

Figure 2:
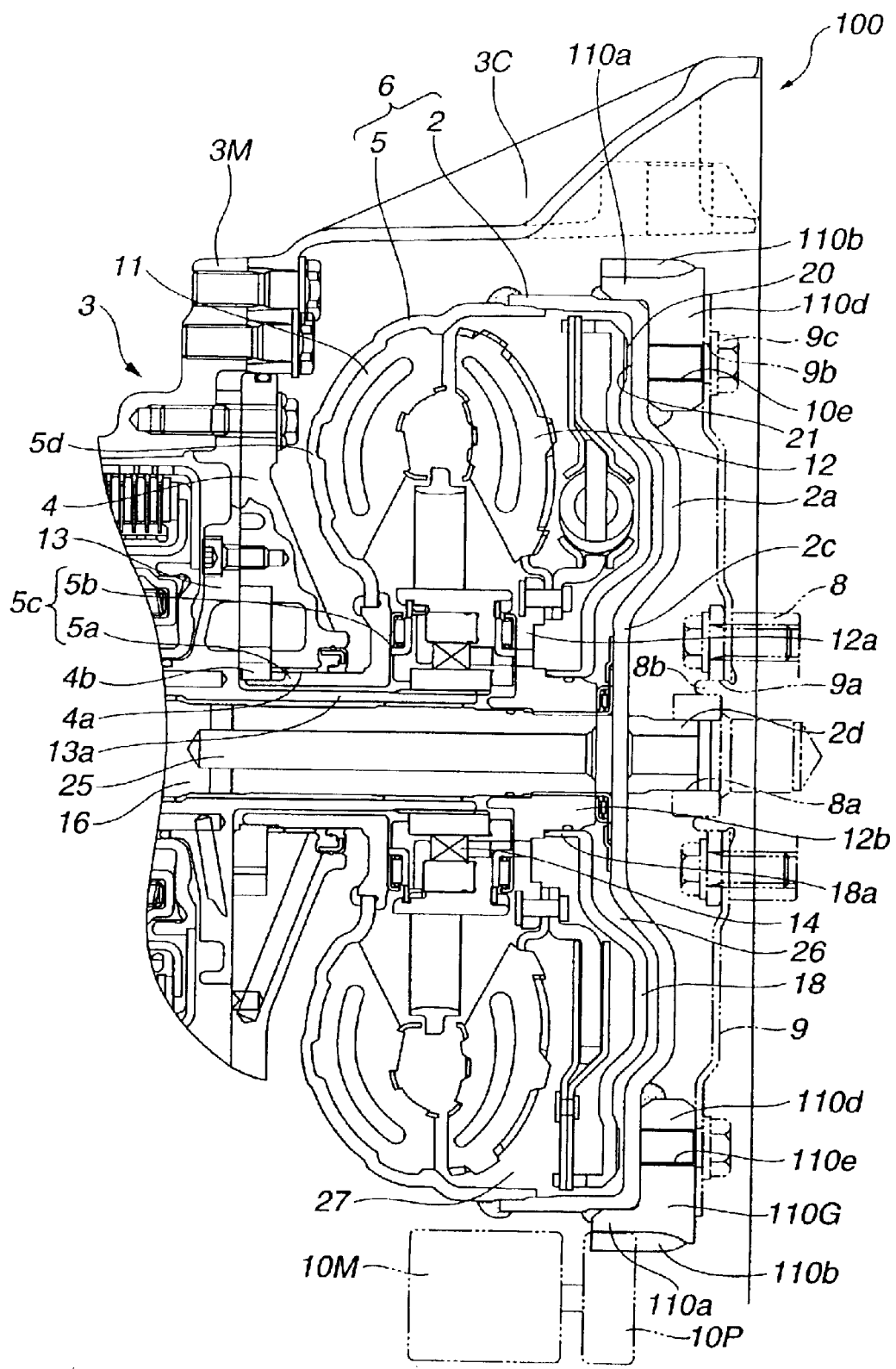
FIG. 2 is a view similar to FIG. 1 but shows a second embodiment.
Figure 3:
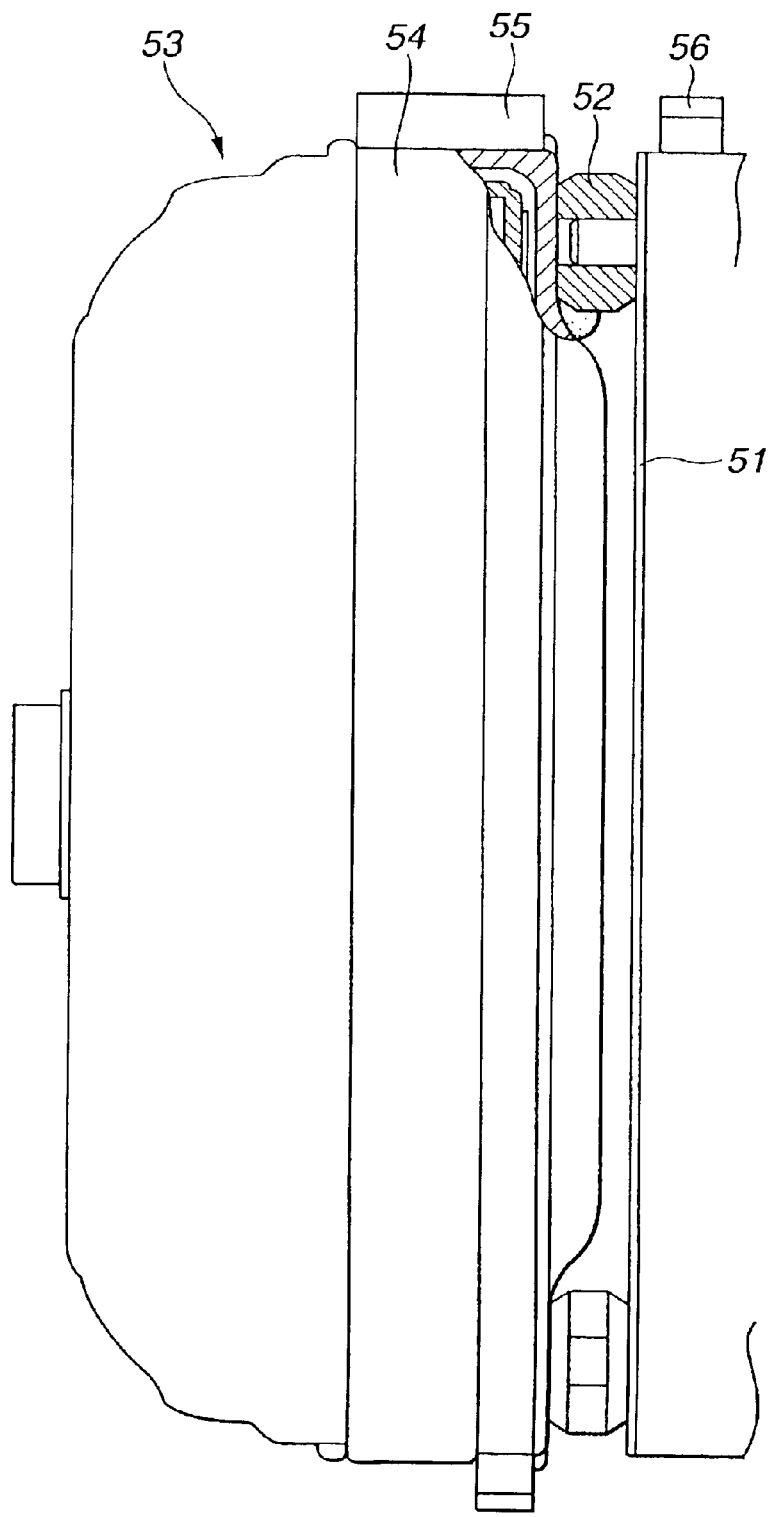
FIG. 3 is a partly sectional, side view of a torque converter according to a related art.

With reference to FIG. 2, the second embodiment will be described.

In this embodiment, a torque converter 100 has a starter ring gear 110G adapted to have a connecter function in addition to an inertia mass function and a starter function.

Namely, in the second embodiment, as shown in FIG. 2, the starter ring gear 110G has an annular body 110a including a toothed ring gear portion 110b disposed on the hollow cylindrical portion 2b of the front cover member 2 and an inertia portion 110d in the form of a radially inward annular flange and extending radially inward from the ring gear portion 110b and along the circular plate portion 2a of the front cover member 2 so as to have an L-shaped cross section. The inertia portion 110d is formed with threaded holes 110e corresponding in position to the nuts 7. The rear end of the toothed ring gear portion 110b and the radially inner end of the inertia portion 110d are welded to the hollow cylindrical portion 2b and the circular plate portion 2a of the front cover member 2, respectively. Except for the above, this embodiment is substantially similar to the first embodiment, so that like parts and portions will be designated by like reference characters and repeated description thereto is omitted for brevity.

Since the starter ring gear 110G is formed with the threaded holes 110e that constitute a connecting portion for connection to the drive plate 9 that is in turn connected to the engine, in addition to having an inertia mass function, the second embodiment has more functions and can reduce the number of constituent parts and the man-hour for assembly as compared with the first embodiment. Furthermore, since the inertia portion 110d is positioned on the side of and held in contact with the circular plate portion 2a of the front cover member 2, i.e., a side surface of the converter cover 6 opposite to the flat surface 21 facing the lock-up facing 20, the flat surface 21 can be increased in the rigidity against the force applied thereto when put into engagement with the lock-up facing 20 and thus can maintain an improved flatness.

Although the invention has been described above by reference to certain embodiments of the invention, the invention is not limited to the embodiments described above. Modifications and variations of the embodiments described above will occur to those skilled in the art, in light of the above teachings. For example, while in the second embodiment description is made as to the case in which the flange portion 110d is formed with the female-threaded holes 110e, this is not for the purpose of limitation but the flange portion 110d may be provided with stud bolts in place of the female-threaded holes 110e. In such a case, the drive plate 9 can be fixed by means of nuts screwed onto the stud bolts. Further, while the ring gear has been described and shown as the starter ring gear, this is not for the purpose of limitation but the ring gear can be of the kind for another usage. The scope of the invention is defined with reference to the following claims.

What is claimed is:

1. A torque converter comprising:

a converter cover for connection to a power source;

a pump impeller attached to the converter cover;

a turbine;

a stator interposed between the pump impeller and the turbine; and a ring gear attached to the converter cover and adapted to increase moment of inertia of the converter cover, wherein the ring gear comprises a hollow cylindrical body including a toothed ring gear portion and an inertia portion that are disposed side by side in an axial direction of the ring gear, the ring gear being mounted on an outer circumferential periphery of the converter cover.

2. The torque converter according to claim 1, wherein the converter cover comprises a plurality of nuts disposed in a circular array on a side surface of the converter cover, the nuts constituting a connecting portion of the converter cover for connection to the power source.

3. The torque converter according to claim 1, wherein the ring gear comprises a starter ring gear.

4. A torque converter comprising:

a converter cover for connection to a power source;

a pump impeller attached to the converter cover;

a turbine;

a stator interposed between the pump impeller and the turbine; and a ring gear attached to the converter cover and adapted to increase moment of inertia of the converter cover.

wherein the ring gear comprises an annular body including a toothed ring gear portion disposed on an outer circumferential periphery of the converter cover and an inertia portion in the form of a radially inward annular flange and extending radially inward from the toothed ring gear portion, the inertia portion having a connecting portion for connecting the converter cover to the power source, and wherein the inertia portion of the ring gear is in contact with a side surface of the converter cover.

5. The torque converter according to claim 4, wherein the connecting portion comprises a plurality of threaded holes formed in the inertia portion of the ring gear.

6. The torque converter according to claim 4, wherein the ring gear comprises a starter ring gear.

7. A torque converter comprising:

a converter cover connected to a power source and constituting part of a power input system of the torque converter;

a pump impeller attached to the converter cover;

a turbine for connection to a transmission input shaft;

a stator interposed between the pump impeller and the turbine; and a ring gear attached to the converter cover and adapted to increase moment of inertia of the power input system, wherein the ring gear comprises a hollow cylindrical body including a toothed ring gear portion and an inertia portion that are disposed side by side in an axial direction of the ring gear, the ring gear being mounted on an outer circumferential periphery of the converter cover.

8. The torque converter according to claim 7, wherein the converter cover comprises a plurality of nuts disposed in a circular array on a side surface of the converter cover, the nuts constituting a connecting portion of the converter cover for connection to the power source.

9. The torque converter according to claim 7, wherein the ring gear comprises a starter ring gear.

10. A torque converter comprising:
   a converter cover connected to a power source and constituting part of a power input system of the torque converter;
   a pump impeller attached to the converter cover;
   a turbine for connection to a transmission input shaft;
   a stator interposed between the pump impeller and the turbine; and
   a ring gear attached to the converter cover and adapted to increase moment of inertia of the power input system.
   wherein the ring gear comprises an annular body including a toothed ring gear portion disposed on an outer circumferential periphery of the converter cover and an inertia portion in the form of a radially inward annular flange and extending radially inward from the toothed ring gear portion, the inertia portion having a connecting portion for connecting the converter cover to the power source, and
   wherein the inertia portion of the ring tear is in contact with a side surface of the converter cover.

11. The torque converter according to claim 10, wherein the connecting portion comprises a plurality of threaded holes formed in the inertia portion of the ring gear.

12. The torque converter according to claim 10, wherein the ring gear comprises a starter ring gear.

* * * * *